April 13, 1965 F. X. LAMB 3,177,789
DIAPHRAGM CONTROL ARRANGEMENT
Filed Feb. 27, 1961 3 Sheets-Sheet 1
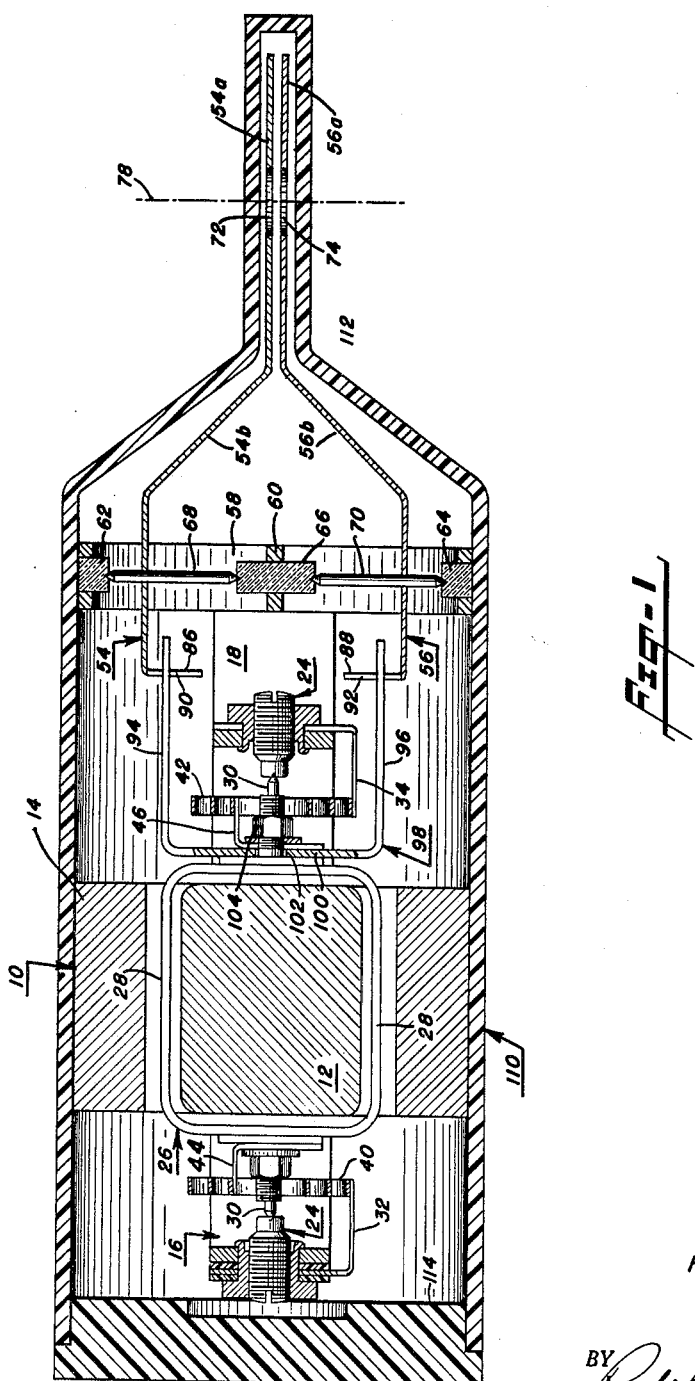
FRANCIS X. LAMB
INVENTOR.
BY Rudolph J. Junick
ATTORNEY

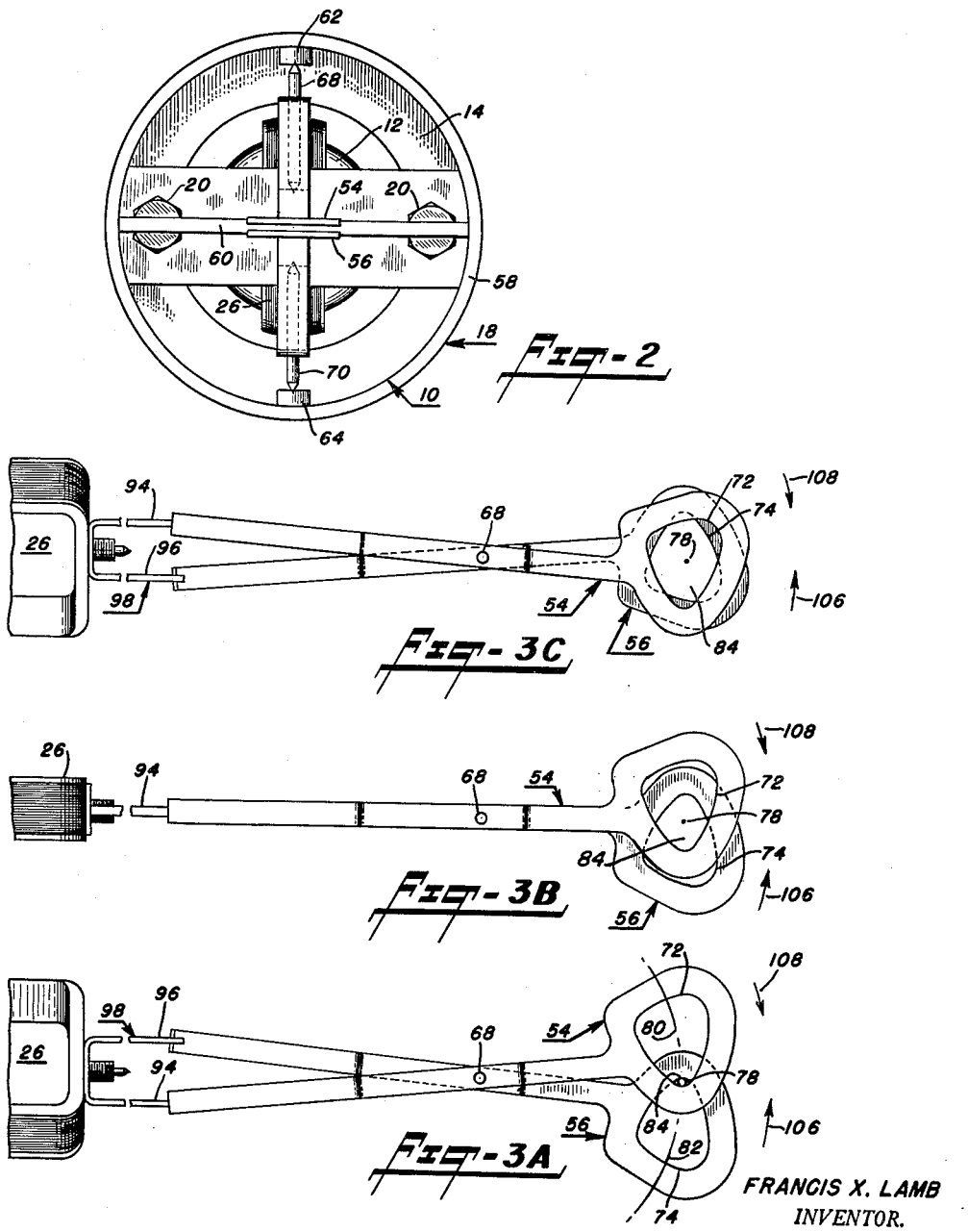

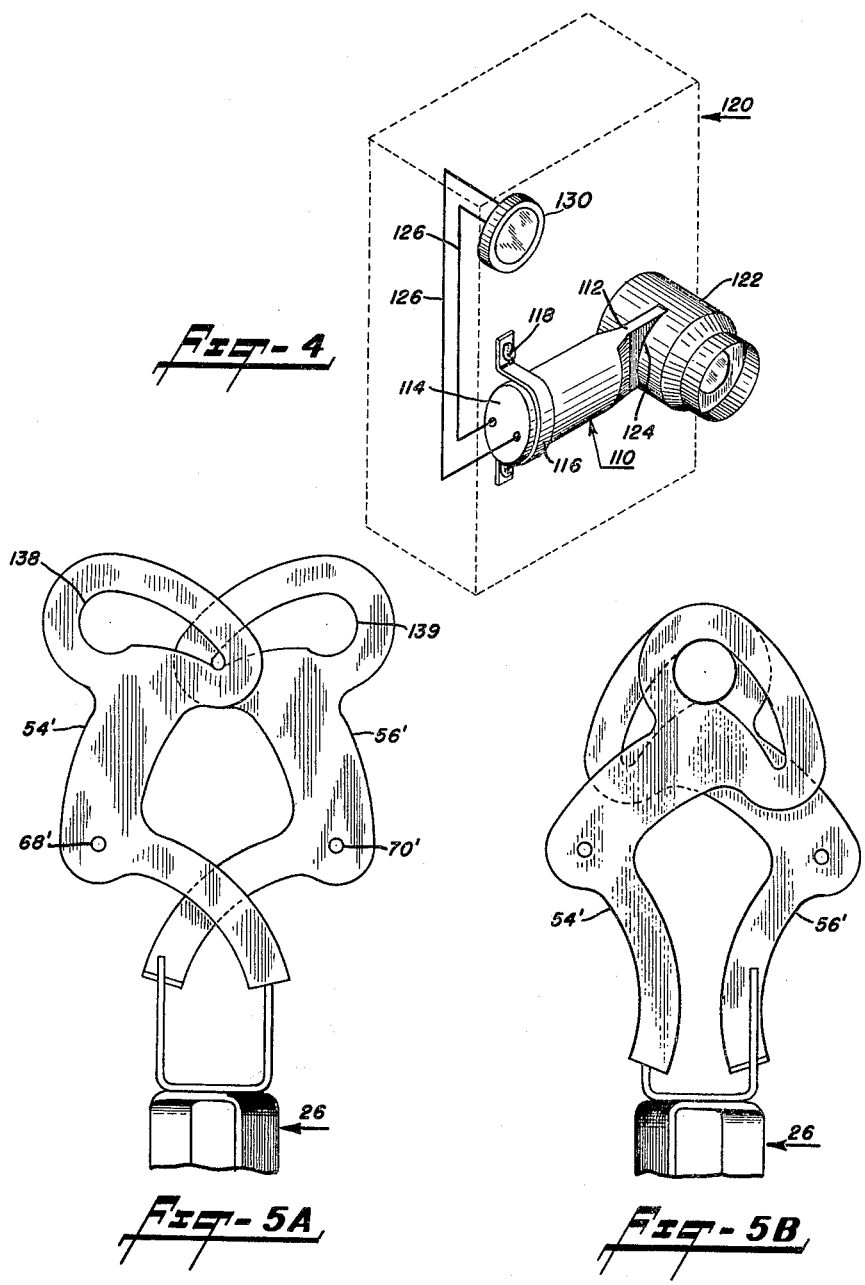

United States Patent Office 3,177,789
Patented Apr. 13, 1965

3,177,789
DIAPHRAGM CONTROL ARRANGEMENT
Francis X. Lamb, East Orange, N.J., assignor to Weston
Instruments, Inc., a corporation of Texas
Filed Feb. 27, 1961, Ser. No. 92,021
5 Claims. (Cl. 95—64)

This invention relates to an automatic diaphragm control arrangement for cameras and the like, as for the control of the camera lens aperture in response to the intensity of ambient light and, more particularly, to a combination meter mechanism and diaphragm for use in such an automatic diaphragm control arrangement.

Automatic diaphragm control arrangements are adapted for use in both motion and still picture cameras to automatically adjust the lens aperture thereof with changes in the brightness of the scene being photographed. With motion picture cameras differences in the scene brightness may result from momentary clouding over of the sun, movement of the subject into areas having differing backgrounds, panning of the camera by the operator to secure a panoramic effect, or the like, and if the lens aperture is not adjusted for the varying light conditions, portions of the film are certain to be over or underexposed, with a resultant loss in photographic continuity. Obviously, continuity is also lost if the operator must stop to make frequent lens aperture adjustments under changing lighting conditions. An effective solution to this problem of changing light conditions is an arrangement for automatically varying the camera lens aperture in accordance with the scene brightness.

In general, automatic lens aperture control arrangements include a photoelectric cell which is responsive to the intensity of light from the scene or subject being filmed. The photocell output is fed to an electrical meter mechanism which, in turn, actuates a diaphragm mechanism for control of the lens aperture in accordance with the intensity of light striking the photocell. I provide a novel electrical instrument and diaphragm construction for use in such automatic lens aperture control arrangements which construction is extremely light-weight and compact. The construction is readily adapted for use in conversion of manually adjustable diaphragm arrangements to automatic control arrangements with only minor modification of the camera lens tube, or the like.

Any suitable meter mechanism, preferably of the permanent magnet moving coil type, may be used in the arrangement of my invention. The movable coil is connected through a novel mechanical linkage to a pair of thin vanes comprising the diaphragm mechanism for actuation thereof. The vanes are pivotably movable about a common axis which extends at right angles to the pivot axis extended of the movable coil.

An object of this invention is the provision of a low friction, light-weight and compact movable coil instrument mechanism and attached diaphragm members for use in an automatic lens aperture control arrangement for cameras, or the like.

An object of this invention is the provision of an electrical instrument mechanism and diaphragm arrangement comprising a unit which is detachably securable to a camera for ease in manufacturing, adjusting, servicing, and shipping thereof.

An object of this invention is the provision of a coupled diaphragm mechanism and movable coil electrical instrument which includes a pair of spaced crank arms extending parallel with the movable coil axis, the said diaphragm comprising a pair of flat vanes pivotably mounted intermediate the ends thereof along a common axis at right angles to the pivot axis of the movable coils, the ends of the vanes extending at an angle with the plane of the vanes and including means forming a slot therein engageable by the crank arms for pivotable actuation of the vanes in opposite rotary directions.

These and other objects and advantages of the invention will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 1 is a longitudinal sectional view of an instrument-actuated diaphragm arrangement embodying my invention;

FIGURE 2 is a front view of the mechanism shown in FIGURE 1 but removed from the case;

FIGURES 3A, 3B and 3C are fragmentary top views of the diaphragm arrangement in substantially closed, partially open and fully open lens aperture conditions, respectively;

FIGURE 4 is a perspective view showing the mechanism attached to a camera; and

FIGURES 5A and 5B are fragmentary top views of a modified form of diaphragm arrangement incorporating my invention, showing the lens opening in substantially closed and fully opened positions, respectively.

Referring to FIGURES 1 and 2 of the drawings, there is shown an electrical instrument mechanism 10 of the permanent core magnet moving coil type comprising a core magnet 12 surrounded by a soft iron yoke 14. Bridge members 16 and 18 are secured by bolts 20 to the ends of the generally cylindrical-shaped yoke 14 (only the bolts 20 fastening the front bridge member 18 to the yoke are shown in FIGURE 2), which bridges carry jewel bearing assemblies 24, 24. A wire wound movable coil 26 having sides 28, 28 extending through annular flux gaps formed between the magnet and yoke, is provided with pivot pins 30, 30 seated in the jewel bearings of the assemblies 24, 24 for pivotable support of the coil about the axis of the pivot pins. Spring abutments 32 and 34 are suitably secured to the bridge members 16 and 18, and spiral springs 40 and 42 are secured to the abutments at one end thereof, while the other end of the springs are connected through spring abutments 44 and 46, respectively, to the movable coil 26. Current from the photoelectric cell, not shown in FIGURES 1 and 2, is conducted to the movable coil 26 through the spiral springs 40 and 42 in a manner well known to those skilled in the art. It will be understood that the instrument mechanism thus far described is of conventional design.

In accordance with my invention, the bridge arrangement 18 secured to the front bridge of the instrument for the support of the front bearing assembly 24 also provides means for the pivotable support of a pair of vanes 54, 56 which vanes comprise an adjustable diaphragm actuated by the movable coil through a novel connecting arrangement. The bridge arrangement 18 may include, for example, a cylindrical-shaped portion 58 having a center bridge member 60 extending across the diameter thereof. Jewel bearing assemblies 62 and 64 are carried at diagonally opposite points on the bridge portion 58, while a pair of back-to-back bearing assemblies 66, 66 are carried by the center bridge 60. A staff 68 and 70 is secured to each vane 54 and 56, respectively, intermediate the ends of the vanes with the ends of the staffs extending from both faces of the vanes and forming pointed pivots rotatably mounted in the jewel bearing assemblies 62, 64 and 66, 66.

The outer free ends 54a and 56a of the vanes 54 and 56 are provided with arcuate apertures or slots 72 and 74, respectively. A lens aperture is provided by the slots 72 and 74 along the lens, or optical, axis 78 of the photographic apparatus, the effective size of which lens aperture depends upon the energization of the coil 26 which, in turn, depends upon the light striking a photocell having an output connected to the said coil. The vanes 54 and 56 may be positioned behind camera lenses and in front of a photographic film, while means forming a suitable exposure aperture in alignment with the lens or optical axis and a shutter actuated in timed relation with the intermittent feed of the photographic film are included in a camera construction in the usual manner, as will be understood by those skilled in this art. As is clearly shown in FIGURES 3A, 3B and 3C, the closely spaced vanes 54 and 56 overlap along the camera lens axis 78 with the apertures 72 and 74 forming a diaphragm opening designated 84 at the lens axis 78 which is variable upon simultaneous rotation of the vanes. As viewed in FIGURE 3A, the extended axes 80 and 82 of the arcuate slots 72 and 74, respectively, are of the same radius with the center of curvature thereof at the axis of the staffs 68 and 70.

The vane ends 54a and 56a, within which the apertures are formed, are closely spaced axially to reduce vignette to a minimum; the close spacing being provided by offset portions 54b and 56b formed in the vanes. The inner free ends of the vanes 54 and 56 are bent inwardly at right angles to the vane to form tabs 86 and 88, respectively. Means forming vertical slots 90 and 92 are included in the tabs 86 and 88 into which slots generally parallel and preferably cylindrical-shaped arms 94 and 96 of a U-shaped structure 98 extend. The base portion 100 of the U-shaped structure is formed with a hole 102 therein through which the front pivot 30 extends, with the structure being secured to the pivot by a knot 104 which also secures the spring abutment 46 thereto. Thus, it will be understood that with the U-shaped structure secured to the coil, the structure will rotate upon rotation of the coil. The pivotable movement of the arms 94 and 96 about the pivot axis of the coil 26 is transmitted to the vanes 54 and 56 through the slotted tabs 86 and 88 formed thereon; the arms 94 and 96 being free to move longitudinally of the slots and to also pivot about the axis of such slots. Only the horizontal component of the rotary motion of the arms 94 and 96 (as viewed in FIGURE 1) contributes to the rotary motion of the vanes 54 and 56. Under minimum, or zero light conditions, the instrument coil 26 is in its normal zero position (as provided by the spiral springs 40 and 42) wherein the vane apertures intersect at the wide ends thereof, as shown in FIGURE 3C. It will be noted that the wide ends of the apertures provide a maximum diaphragm opening under low light conditions. As the light intensity impinging on the photocell connected to the instrument increases, the instrument is energized and the movable coil deflected from its normal zero position to thereby decrease the diaphragm opening. As viewed in FIGURE 2, the instrument coil rotates in a counterclockwise direction about its pivot axis with increased energization of the said coil. As viewed in FIGURES 3A, 3B and 3C, the vane 54 is rotated in a counterclockwise direction and the vane 56 in a clockwise direction in the direction of the arrows 106 and 108, respectively, with increasing energization of the instrument.

The entire instrument and diaphragm arrangement, described above, may be housed in a generally cylindrical-shaped housing 110 having an elongated end 112 of reduced height of transparent material within which the vanes operate. Suitable means, not shown, may be included to fasten the instrument therewithin. A rear cover 114 substantially seals the mechanism within the casing. The unitary assembly, as described above, is easily adapted for use on a camera. Reference is made to FIGURE 4 of the drawings wherein the device is shown attached by a strap 116 and fastening means 118 to the front of a camera case 120, indicated in broken lines. The illustrated camera includes a lens tube 122 having an opening 124 formed in the side thereof into which the end 112 of the device extends. The instrument is connected through lead wires 126, 126 to a photoelectric cell 130 for automatic control of the camera lens aperture.

Having now described my invention in detail, in accordance with the requirements of the patent statutes, various changes and modifications will suggest themselves to those skilled in this art. For example, the tabs 86 and 88 formed on the ends of the vanes could be bent in the opposite directions than illustrated i.e., with the tabs extending in opposite outward directions rather than the illustrated inward directions. Further, various other bridge structures for the support of the vanes, and other instrument mechanism could obviously be used. In FIGURES 5A and 5B, a modified form of the invention is shown in which the vanes designated 54' and 56' pivot about spaced axes, rather than a common axis. The novel "slot" and "arm" drive connection between the coil 26 and vanes is employed in the modified arrangement in which the vane staffs 68' and 70' pivot in suitable bearings, not shown. With the FIGURE 5A and 5B arrangement, elongated apertures 138 and 139 of a generally conventional shape may be formed in the vanes to form the lens opening. It is intended that these and other such changes and modifications shall fall within the spirit and scope of the invention as recited in the following claims.

I claim:

1. A diaphragm arrangement comprising a pair of spaced vanes pivotable about a pair of mutually parallel pivot axes and each having an arcuate aperture formed therein which apertures cooperate to form a diaphragm opening, an electrical instrument having a movable coil pivotable about a coil pivot axis, the coil pivot axis extended intersecting the plane of the pivot axes of the vanes at right angles thereto and equidistant from the pivot axes, a U-shaped member secured to the coil and having a pair of arms extending generally parallel to the coil pivot axis and spaced therefrom, and slot and arm coupling means between the arms and the vanes for actuation of the vanes in opposite directions upon rotation of the coil.

2. A diaphragm arrangement comprising a pair of spaced vanes pivotable about a common pivot axis and each having an arcuate aperture formed therein which apertures cooperate to form a diaphragm opening, an electrical instrument having a movable coil pivotable about a coil pivot axis, the coil pivot axis extended intersecting the pivot axis of the vanes at right angles thereto, a U-shaped member secured to the coil and having a pair of arms extending generally parallel to the coil pivot axis, means forming tabs at the ends of the vanes extending at an angle with the vanes, and means forming slots in the tabs engageable by the arms of the U-shaped member for pivotable actuation of the vanes in opposite directions upon rotation of the coil.

3. A diaphragm arrangement comprising a generally hollow cylindrical housing having a transparent portion at one end, a pair of spaced vanes pivotably mounted in said housing about a common pivot axis each having an arcuate aperture formed therein which apertures cooperate to form a diaphragm opening at said one end, means forming tabs at the ends of the vanes extending at an angle with the vanes, means forming elongated slots in the tabs, an electrical instrument having a movable coil pivotable about a coil pivot axis and mounted in said cylindrical housing with the coil pivot axis substantially parallel to the axis of said cylindrical housing and intersecting said common pivot axis at right angles thereto, a pair of arms secured to the coil and extending generally parallel to the coil pivot axis and spaced therefrom, the said arms engaging the slots formed in the tabs for actuation of the vanes in opposite directions upon rotation of the coil.

4. A diaphragm arrangement comprising a pair of spaced vanes pivotable about a common pivot axis and each having an arcuate aperture formed therein which apertures cooperate to form a diaphragm opening, an electrical instrument having a movable coil pivotable about a coil pivot axis, the coil pivot axis extended intersecting the pivot axis of the vanes at right angles thereto, a pair of spaced crank arms secured to the movable coil and extending generally parallel to the movable coil axis, and slot and arm coupling means between the arms and the vanes for actuation of the vanes in opposite directions upon rotation of the coil.

5. A diaphragm arrangement comprising a pair of spaced vanes pivotable about a common pivot axis and each having an arcuate aperture formed therein which apertures cooperate to form a diaphragm opening, an electrical instrument having a movable coil pivotable about a coil pivot axis, the coil pivot axis extended intersecured to the coil and pivotable about the coil pivot axis, a crank member having a pair of arms oppositely disposed about the coil pivot axis, said crank member being secting the pivot axis of the vanes at right angles thereto, and slot and arm coupling means between the arms and the vanes for actuation of the vanes in opposite directions upon rotation of the coil.

References Cited in the file of this patent

UNITED STATES PATENTS

| | | |
|---|---|---|
| 2,206,086 | Gaylon | July 2, 1940 |
| 2,251,473 | Touceda | Aug. 5, 1941 |
| 2,995,996 | Gossen | Aug. 15, 1961 |

FOREIGN PATENTS

| | | |
|---|---|---|
| 1,096,744 | Germany | Jan. 5, 1961 |
| 1,182,694 | France | Jan. 19, 1959 |